(12) United States Patent
Sakurai

(10) Patent No.: US 8,332,915 B2
(45) Date of Patent: Dec. 11, 2012

(54) INFORMATION PROCESSING SYSTEM, INFORMATION PROCESSING APPARATUS, MOBILE TERMINAL AND ACCESS CONTROL METHOD

(75) Inventor: Satoshi Sakurai, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1266 days.

(21) Appl. No.: 11/798,465

(22) Filed: May 14, 2007

(65) Prior Publication Data

US 2008/0028227 A1 Jan. 31, 2008

(30) Foreign Application Priority Data

Jul. 25, 2006 (JP) ................................. 2006-202356

(51) Int. Cl.
H04L 29/06 (2006.01)

(52) U.S. Cl. .............................. 726/5; 713/168; 713/182

(58) Field of Classification Search .......................... None
See application file for complete search history.

(56) References Cited

U.S. PATENT DOCUMENTS

| | | | | |
|---|---|---|---|---|
| 6,075,860 | A * | 6/2000 | Ketcham | 713/159 |
| 6,480,958 | B1 * | 11/2002 | Harrington | 713/184 |
| 7,310,424 | B2 * | 12/2007 | Gehring et al. | 380/277 |
| 2002/0116344 | A1 * | 8/2002 | Kinoshita et al. | 705/65 |
| 2002/0147036 | A1 * | 10/2002 | Taguchi et al. | 455/573 |
| 2003/0014646 | A1 * | 1/2003 | Buddhikot et al. | 713/184 |
| 2003/0166397 | A1 * | 9/2003 | Aura | 455/410 |
| 2004/0049685 | A1 * | 3/2004 | Jaloveczki | 713/182 |
| 2004/0202329 | A1 * | 10/2004 | Jung et al. | 380/273 |

FOREIGN PATENT DOCUMENTS

| | | |
|---|---|---|
| JP | 2000-222289 | 8/2000 |
| JP | 2002-116840 | 4/2002 |
| JP | 2002-530772 | 9/2002 |
| JP | 2003-288328 | 10/2003 |
| JP | 2006-60392 | 3/2006 |
| JP | 2006-157887 | 6/2006 |
| WO | 2005/124932 A2 | 12/2005 |
| WO | WO2006/072978 | 7/2006 |

OTHER PUBLICATIONS

Japanese Office Action mailed Dec. 13, 2011 issued in corresponding Japanese Patent Application No. 2006-202356.

* cited by examiner

*Primary Examiner* — Gilberto Barron, Jr.
*Assistant Examiner* — David Le
(74) *Attorney, Agent, or Firm* — Staas & Halsey LLP

(57) ABSTRACT

An information processing system including a computer and a mobile terminal that can communicate with the computer in a predetermined area is disclosed. In the information processing system, the computer sends code to the mobile terminal, the mobile terminal encrypts user information using the code sent from the computer, and sends the encrypted user information to the computer, the computer decodes the encrypted user information sent from the mobile terminal using the code, and compares the decoded information with user information that is registered beforehand. Then, when the decoded user information is the same as the user information that is registered, the computer permits access to the computer, but when the decoded information is not the same as the user information that is registered, the computer prohibits access to the computer.

15 Claims, 9 Drawing Sheets

| ID | P |
|---|---|
| ID1 | P1 |
| ID2 | P2 |
| ID3 | P3 |
| ⋮ | ⋮ |
| IDN | PN |

INFORMATION PROCESSING SYSTEM, INFORMATION PROCESSING APPARATUS, MOBILE TERMINAL AND ACCESS CONTROL METHOD

BACKGROUND OF THE INVENTION

1. Field of the Invention

The present invention relates to an information processing system, an information processing apparatus, a mobile terminal and an access control method. More particularly, the present invention relates to an information processing system including an computer and a mobile terminal that can communicate with the computer in a predetermined area, and relates to an information processing apparatus, the mobile terminal and an access control method.

2. Description of the Related Art

Currently, when accessing a computer, access control is performed in which a user is requested to input an identification number and a password, and if the identification number and the password input by the user are the same as an identification number and a password registered beforehand, the access is permitted. In such an access control method, since it is necessary for the user to input the identification number and the password, operability is not good. In addition, considering the user input, the length of the identification number and the password cannot be increased without reason, so that it is difficult to improve confidentiality.

To improve operability and confidentiality, an access control method is proposed for using a biometrics authentication apparatus that uses biometrics such as fingerprint and vein.

However, in any methods, when the user leaves the computer, the user needs to log off the computer for preventing other user from accessing the computer. When the computer is logged off, entering the identification number and the password or entering fingerprint or vein becomes necessary again.

Therefore, when the user leaves the computer for a short time, logging off is not performed in many cases. Thus, security of the computer is not kept.

Japanese Laid-Open Patent Application No. 2002-530772 (Patent document 1) discloses a system for improving operability for logging on in which, when logging on to a PC, the PC sends a predetermined bit pattern to a mobile phone, the mobile phone encrypts the bit pattern supplied from the PC and returns it to the PC, the PC decrypts the bit pattern, then, if the decrypted bit pattern is the same as the original bit pattern, logging on to the PC is permitted.

In addition, Japanese Laid-Open Patent Application No. 2002-116840 (Patent document 2) discloses a security system for performing user authentication at predetermined time intervals between a wireless tag storing ID and PW and a PC by wireless.

However, in the technique disclosed in the patent document 1, the PC sends a predetermined bit pattern to a mobile phone, the mobile phone encrypts the bit pattern supplied from the PC and returns it to the PC, the PC decrypts the bit pattern, then, if the decrypted bit pattern is the same as the original bit pattern, logging on to the PC is permitted. Thus, there is a problem in that inputting operation for providing a key common to the mobile phone and the PC is necessary and setting operation is complicated.

In addition, in the security system using the wireless tag described in the patent document 2, since the wireless tag sends the ID and the PW in response to a request from the computer, there is a problem in that confidentiality cannot be sufficiently kept.

SUMMARY OF THE INVENTION

An object of the present invention is to provide an information processing system, an information processing apparatus, a mobile terminal and an access control method that can improve operability and confidentiality.

According to an embodiment of the present invention, an information processing system including a computer and a mobile terminal that can communicate with the computer in a predetermined area is provided. In the information processing system, the computer sends code to the mobile terminal;

the mobile terminal encrypts user information using the code sent from the computer, and sends the encrypted user information to the computer;

the computer decodes the encrypted user information sent from the mobile terminal using the code, and compares the decoded information with user information that is registered beforehand;

when the decoded user information is the same as the user information that is registered, the computer permits access to the computer, when the decoded information is not the same as the user information that is registered, the computer prohibits access to the computer.

In the system, when the decoded information is not the same as the user information that is registered beforehand for a predetermined time, the computer may prohibit access to the computer. Communication between the computer and the mobile terminal may be performed by a non-contact interface, by a wireless communication scheme, by an optical communication scheme or by a cable communication scheme.

In addition, the mobile terminal may includes a secondary battery, and a power source circuit for charging the secondary battery with power supplied via a communication route of the cable communication scheme.

According to another embodiment of the present invention, an information processing apparatus including a communication unit for communicating a mobile terminal in a predetermined area is provided. The information processing apparatus includes:

a code generation unit configured to generate code used for encryption and sends the code to the mobile terminal using the communication unit a decoding unit configured to decode information received by the communication unit using the code;

an access control unit configured to compare the decoded information with user information that is registered beforehand, permit access to the computer when the decoded information is the same as the user information that is registered, and prohibit access to the computer when the decoded information is not the same as the user information that is registered.

According to still another embodiment of the present invention, a mobile terminal apparatus configured to be able to communicate with a computer in a predetermined area is provided. The mobile terminal apparatus includes:

a communication unit configured to communicate with the computer; and an encryption unit configured to encrypt user information using code received from the computer via the communication unit, and send the encrypted user information to the computer via the communication unit.

According to still another embodiment of the present invention, an access control method in an information processing system including a computer and a mobile terminal that can communicate with the computer in a predetermined area is provided. In the access control method, the computer sends code to the mobile terminal;

the mobile terminal encrypts user information using the code sent from the computer, and sends the encrypted user information to the computer;

the computer decodes the encrypted user information sent from the mobile terminal using the code, and compares the decoded information with user information that is registered beforehand;

when the decoded user information is the same as the user information that is registered, the computer permits access to the computer, when the decoded information is not the same as the user information that is registered, the computer prohibits access to the computer.

According to the present invention, the computer sends code to the mobile terminal, the mobile terminal encrypts user information using the code sent from the computer, and sends the encrypted user information to the computer. Then, the computer decodes the encrypted user information sent from the mobile terminal using the code used for the encryption, and compares the decoded information with user information that is registered beforehand. When the decoded user information is the same as the user information that is registered, the computer permits access to the computer, and when the decoded information is not the same as the user information that is registered, the computer prohibits access to the computer. Accordingly, when the mobile terminal whose user information is stored in the computer resides in a predetermined area for the computer, access to the computer is automatically permitted. When the mobile terminal whose user information is stored in the computer moves outside the predetermined area, access to the computer is automatically prohibited. Therefore, operability of access control to the computer can be improved. In addition, by using the user information registered in the mobile terminal, registration to the computer can be easily performed so that setting for access control can be easily performed.

BRIEF DESCRIPTION OF THE DRAWINGS

Other objects, features and advantages of the present invention will become more apparent from the following detailed description when read in conjunction with the accompanying drawings, in which:

FIG. 3 shows data structure of a user information storing unit 135;

DETAILED DESCRIPTION OF THE PREFERRED EMBODIMENTS

In the following, embodiments of the present invention are described with reference to figures.

Figure 1:
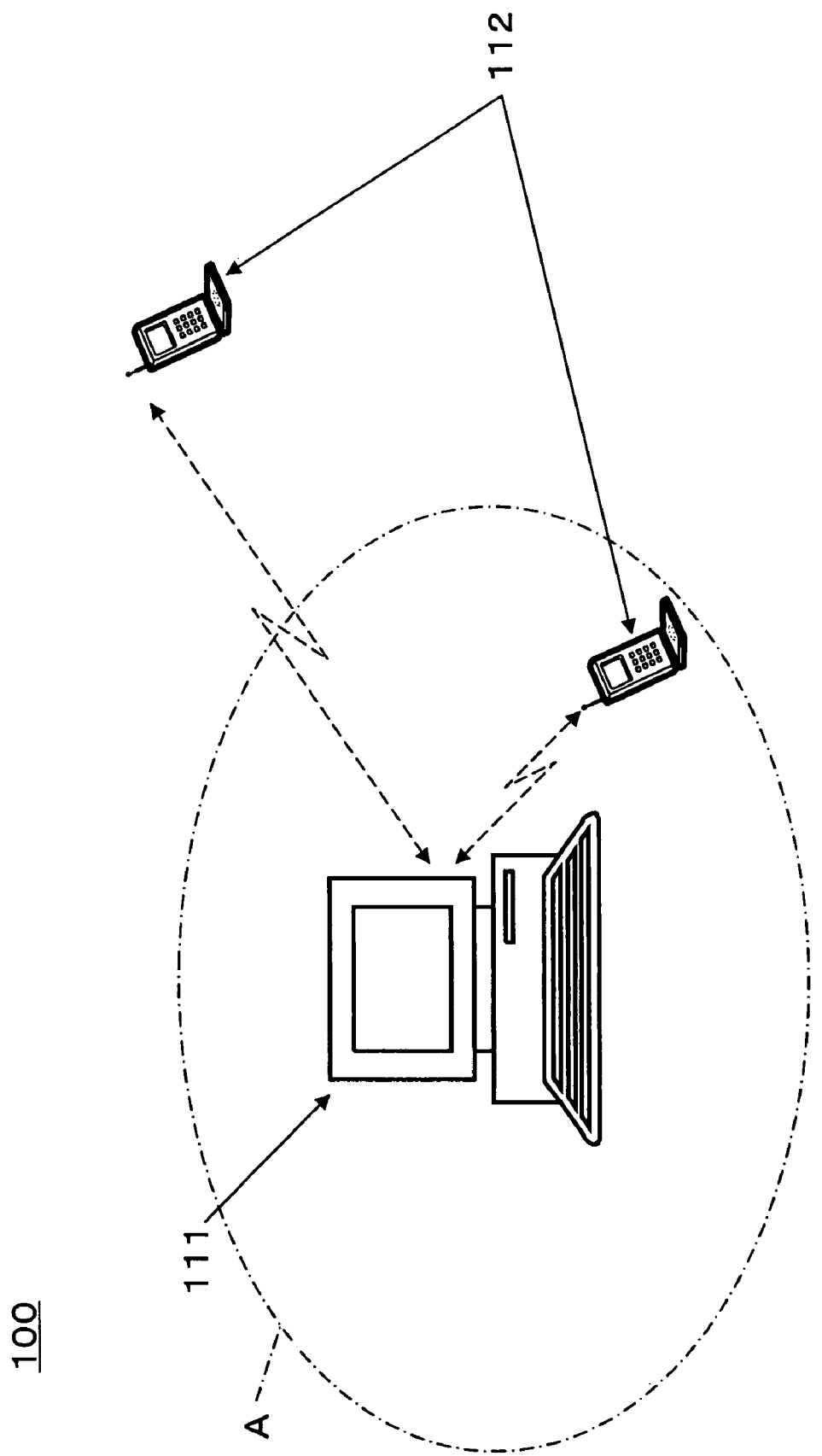
FIG. 1 is a block diagram of an information processing system of a first embodiment of the present invention.

FIG. 1 shows a block diagram of a system of a first embodiment of the present invention.

An information processing system 100 of the present embodiment includes a computer 111 and a mobile terminal apparatus 112. The computer 111 and the mobile terminal apparatus 112 can communicate with each other in a predetermined area A.

Figure 2:
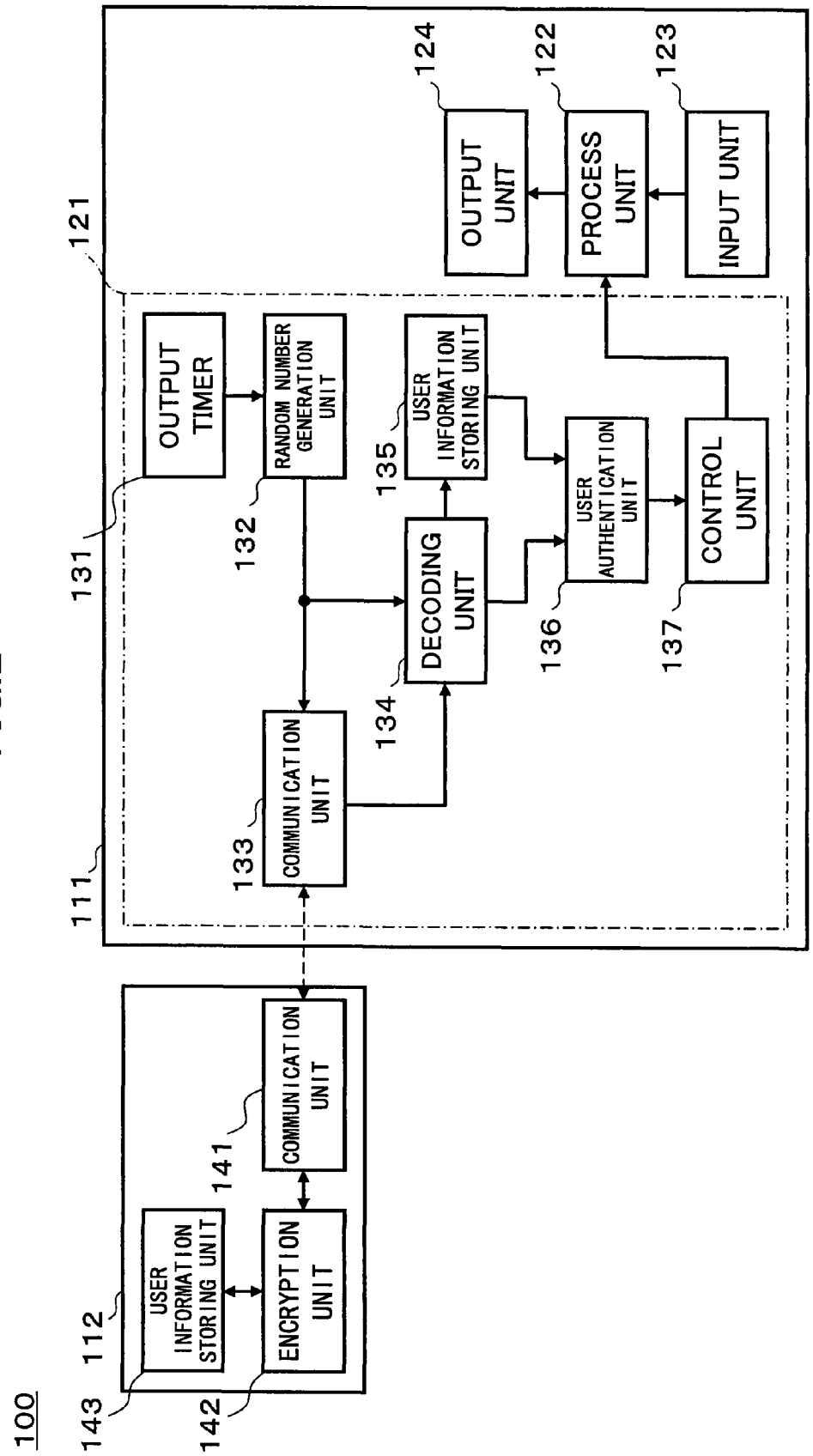
FIG. 2 is a block diagram showing a computer 111 and a mobile terminal apparatus 112 of the first embodiment of the present invention.

As shown in FIG. 2, the computer 111 includes an access control unit 121, a process unit 122, an input unit 123, and an output unit 124.

The access control unit 121 communicates with the mobile terminal apparatus 112 to control access to the computer 111. The access control unit 121 includes an output timer 131, a random number generation unit 132, a communication unit 133, a decoding unit 134, a user information storing unit 135, a user authentication unit 136 and a control unit 137.

The output timer 131 measures a predetermined time to provide a random number generation instruction to the random number generation unit every predetermined time. The random number generation unit 132 generates a random number in response to the random number generation instruction from the output timer 131. The random number generated by the random number generation unit 132 is supplied to the communication unit 133 and the decoding unit 134.

The communication unit 133 is a wireless communication system such as wireless LAN, Blue-Tooth and the like, an optical communication scheme such as IrDA, a non-contact type interface such as a non-contact IC card reader/writer, a cable communication scheme such as USB, or the like. The communication unit 133 can communicate with the mobile terminal apparatus 112. The communication unit 133 sends a random number supplied from the random number generation unit 132 to the mobile terminal apparatus 112. In addition, the communication unit 133 receives data sent from the mobile terminal apparatus 112. The communication unit 133 supplies the received data to the decoding unit 134.

The decoding unit 134 decodes an encrypted message supplied from the communication unit 133 using a random number generated by the random number generation unit 132 as a key. Data decoded by the decoding unit 134 is supplied to the user authentication unit 136.

The user authentication unit 136 compares user information stored in the user information storing unit 135 with data decoded by the decoding unit 134, and supplies a comparison result to the access control unit 137.

Figure 3:
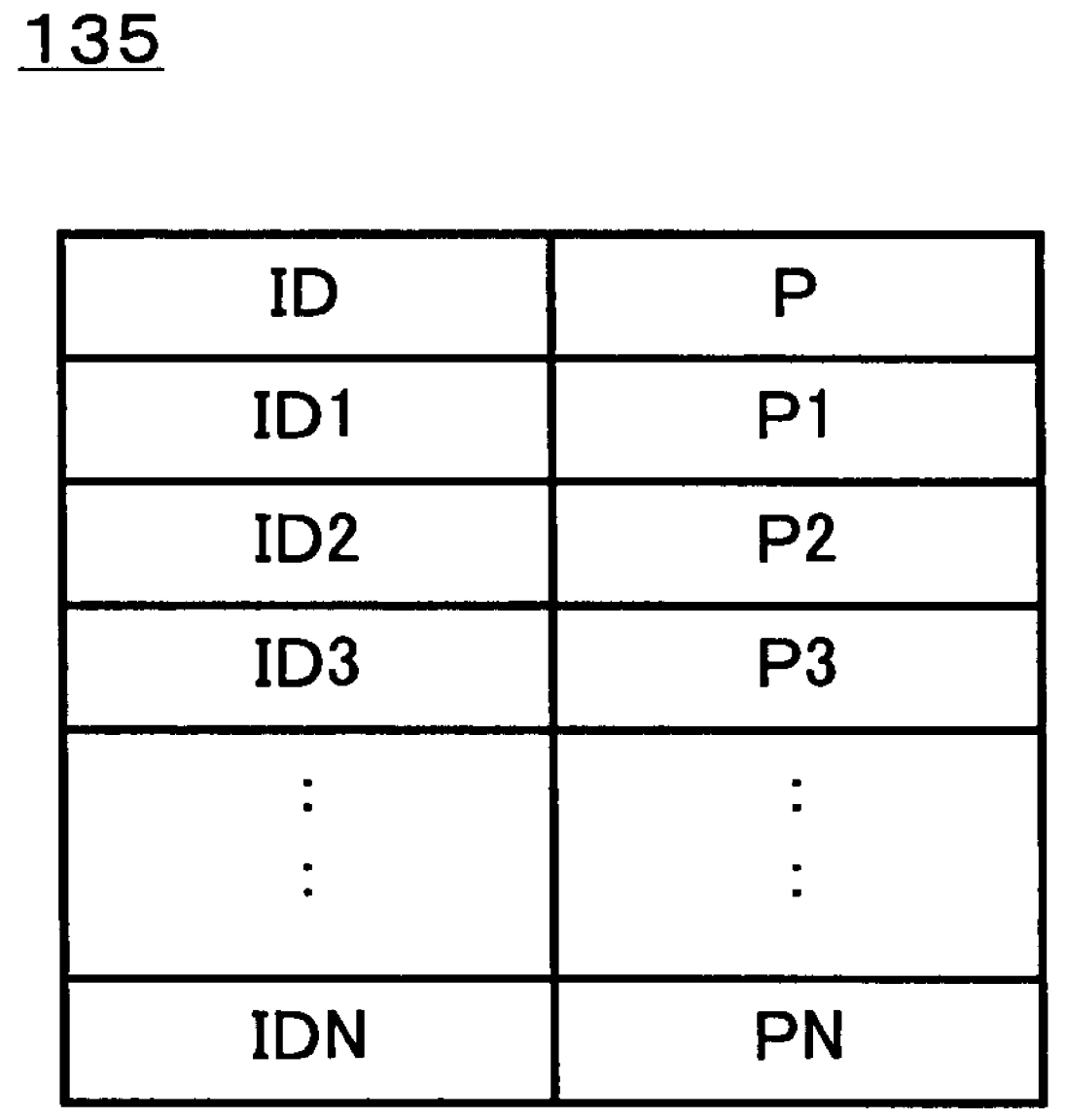

FIG. 3 shows data structure of the user information storing unit 135.

The user information storing unit 135 stores identification information ID1-IDN and passwords P1-PN of mobile terminal apparatuses that are permitted to access the computer 111.

The user authentication unit 136 searches the user information storing unit 135 using data decoded in the decoding unit 134, and determines whether identification information ID and password P exist in the user information storing unit 135.

According to the comparison result by the user authentication unit 136, when the decoded data decoded by the decoding unit 134 is the same as the user information stored in the user information storing unit 135, the access control unit 137 supplies an access permission signal to the processing unit 122. When the decoded data decoded by the decoding unit 134 is not the same as the user information stored in the user information storing unit 135, the access control unit 137 supplies an access prohibiting signal to the process unit 122.

The process unit 122 includes a CPU, a memory, a hard disk drive and the like. The process unit 122 executes data processing based on a program installed in the hard disk beforehand. When the access permission signal is supplied from the access control unit 137, the process unit 122 permits access. When the access prohibiting signal is supplied from the control unit 137, the process unit 122 prohibits access. The access permission/prohibiting by the process unit 122 is realized by permitting/prohibiting data or command input from the input unit 123 to the process unit 122.

The input unit 123 includes a device such as a keyboard or a mouse, and the input unit 123 enters a command or data into the process unit 122. The output unit 124 includes a display such as a LCD or CRT, and displays a process result of the process unit 122 graphically.

The mobile terminal apparatus 112 includes a communication unit 141, an encryption unit 142 and a user information storing unit 143.

The communication unit 141 is a wireless communication system such as wireless LAN and Blue-Tooth, an optical communication scheme such as IrDA, an non-contact type interface such as non-contact ID card reader/writer, or a cable communication scheme such as USB, or the like. The communication unit 141 is configured to be able to communicate with the communication unit 133 of the computer 111. The communication unit 141 supplies a random number supplied by the computer 111 to the encryption unit 142.

When the random number Kt is supplied from the computer 111 from the communication unit 141, the encryption unit 142 encrypts user information stored in the user information storing unit 143 using the random number Kt as a key. The user information storing unit 143 stores identification information IDi and a password Pi as user information.

The encrypted message encrypted in the encryption unit 142 is sent to the computer 111 by the communication unit 141.

Figure 4:
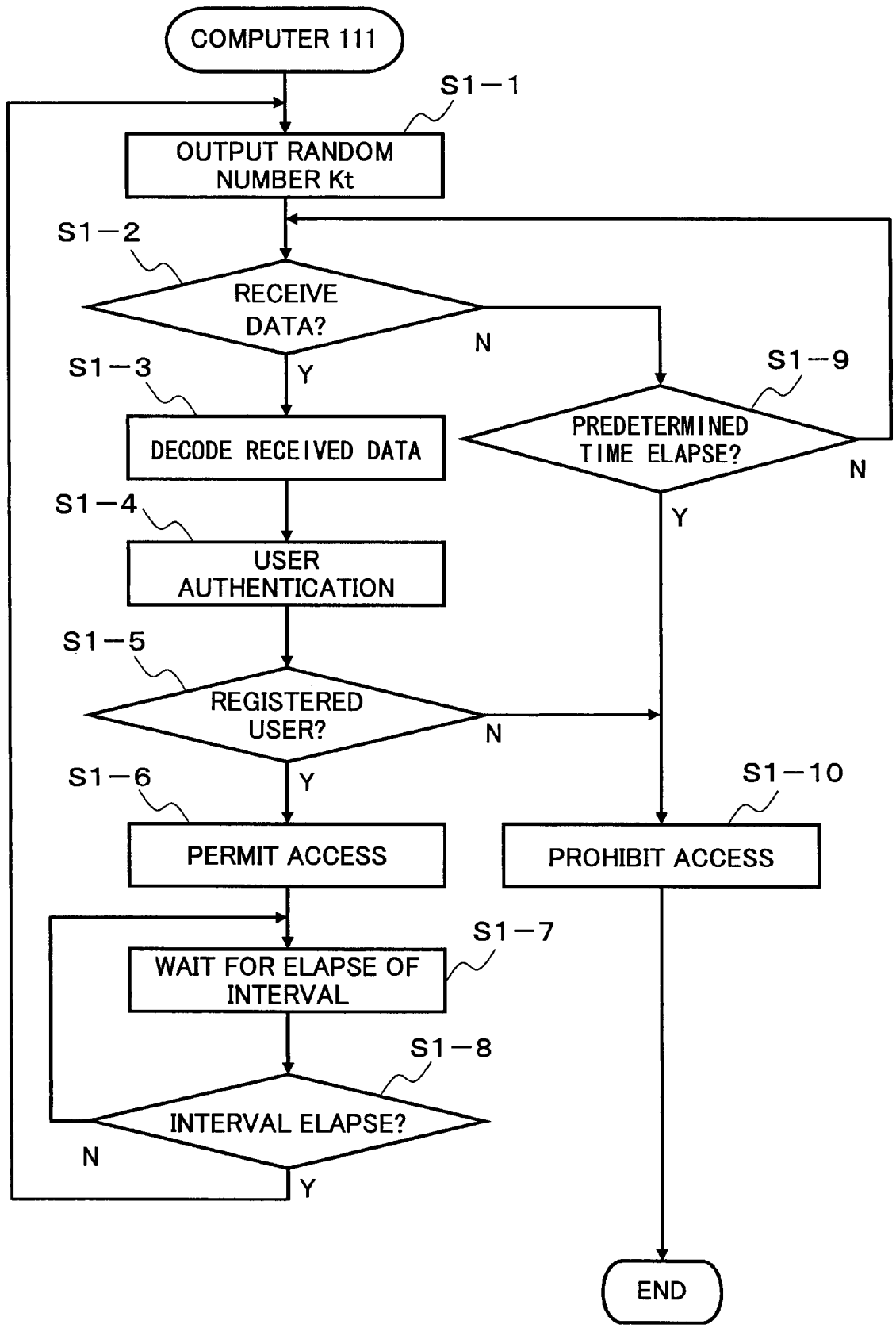
FIG. 4 shows a process flowchart for access control of the computer 111.

Next, processes in the computer 111 are described. FIG. 4 shows a process flowchart of the computer 111.

First, the computer 111 outputs the random number Kt from the random number generation unit 132 in step S1-1. Next, the computer 111 receives data by the communication unit 133 in step S1-2, and decodes the received data by the decoding unit 134 in step S1-3. At this time, the data is decoded using the random number Kt generated by the random number generation unit 132 as a key.

The computer 111 searches the user information table 135 using the decoded data by the user authentication unit 136 in step S1-4. When the decoded data exists in the user information table 135, the computer 111 determines that the data corresponds to registered data by the user authentication unit 136 in step 1-5 so as to permit access to the process unit 122 by the control unit 137 in step S1-6. Then, the computer 111 waits for elapse of an interval by the control unit 121.

Elapse of the interval time is detected by the output timer 131 in step S1-8, the computer 111 returns to step S1-1 to generate a new random number, determines whether the mobile terminal apparatus 112 resides in a predetermined area A to perform access control.

When the computer 111 does not receive data from the mobile terminal apparatus 112 in step S1-2, or when the decoded data does not exist in the user information table 135 in step S1-5, the computer 111 determines whether predetermined time elapses in step S1-9.

When the computer 111 determines that the predetermined time has not been elapsed in step S1-9, the computer 111 checks if data is received by returning to step S1-2. When the computer 111 does not receive data for a predetermined time in steps S1-9, the computer 111 prohibits access to the process unit 122 by the control unit 137 in step S1-10.

Figure 5:
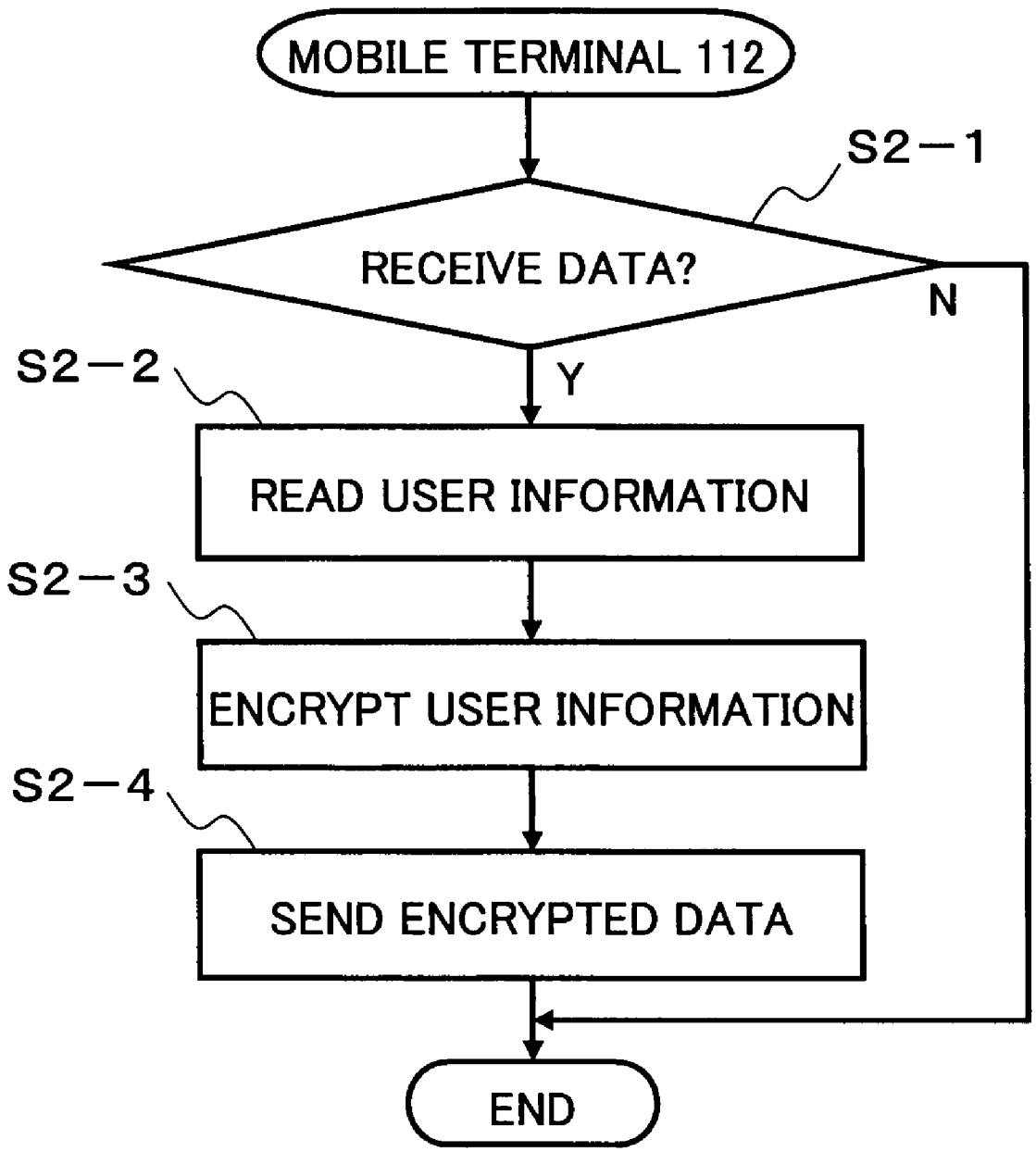
FIG. 5 shows a process flowchart of the mobile terminal apparatus 112.

Next, processes of the mobile terminal apparatus 112 are described. FIG. 5 shows a process flowchart of the mobile terminal apparatus 112.

When the mobile terminal apparatus 112 receives data (random number Kt) from the computer 111 by the communication unit 141 in step S2-1, the mobile terminal apparatus 112 reads identification information and a password from the user information storing unit 143 by the encryption unit 142 in step S2-2. The mobile terminal apparatus 112 encrypts the identification information and the password read by the encryption unit 142 using the data from the computer 111 as a key, and sends the encrypted data to the computer by the communication unit 141 in step S2-4.

By the way, registration of user information of the mobile terminal apparatus 112 into the user information table 135 of the computer 111 can be performed by executing a registration program of the computer 111 in a state where access to the computer 111 is permitted by operation the same as the operation when performing the access control. That is, in a state where the registration process is being executed, the user information decoded by the decoding unit 134 is registered in the user information table 135. By the way, registration of user information may be performed manually using the input unit 123.

In addition, by displaying the use information registered in the user information table 135 on a display forming the output unit 124, it becomes possible to check whether the user information is correctly registered by the user. After checking it, the user information is finally registered into the user information table 135 after performing registration operation.

According to the present embodiment, since the user information is always sent and received after encrypted, good confidentiality can be provided. In addition, it is only necessary to register the identification information and the password of the mobile terminal apparatus 112 into the computer 111. Since the registration of the identification information and the password of the mobile terminal apparatus 112 into the computer 111 can be performed by the same operation as that for performing access control, setting can be performed easily.

In addition, according to the present embodiment, since authentication is performed using user information such as the identification information and the password, a user who is accessing can be identified. In addition, by storing logs of the user information, management of accessing can be performed with reliability.

Figure 6:
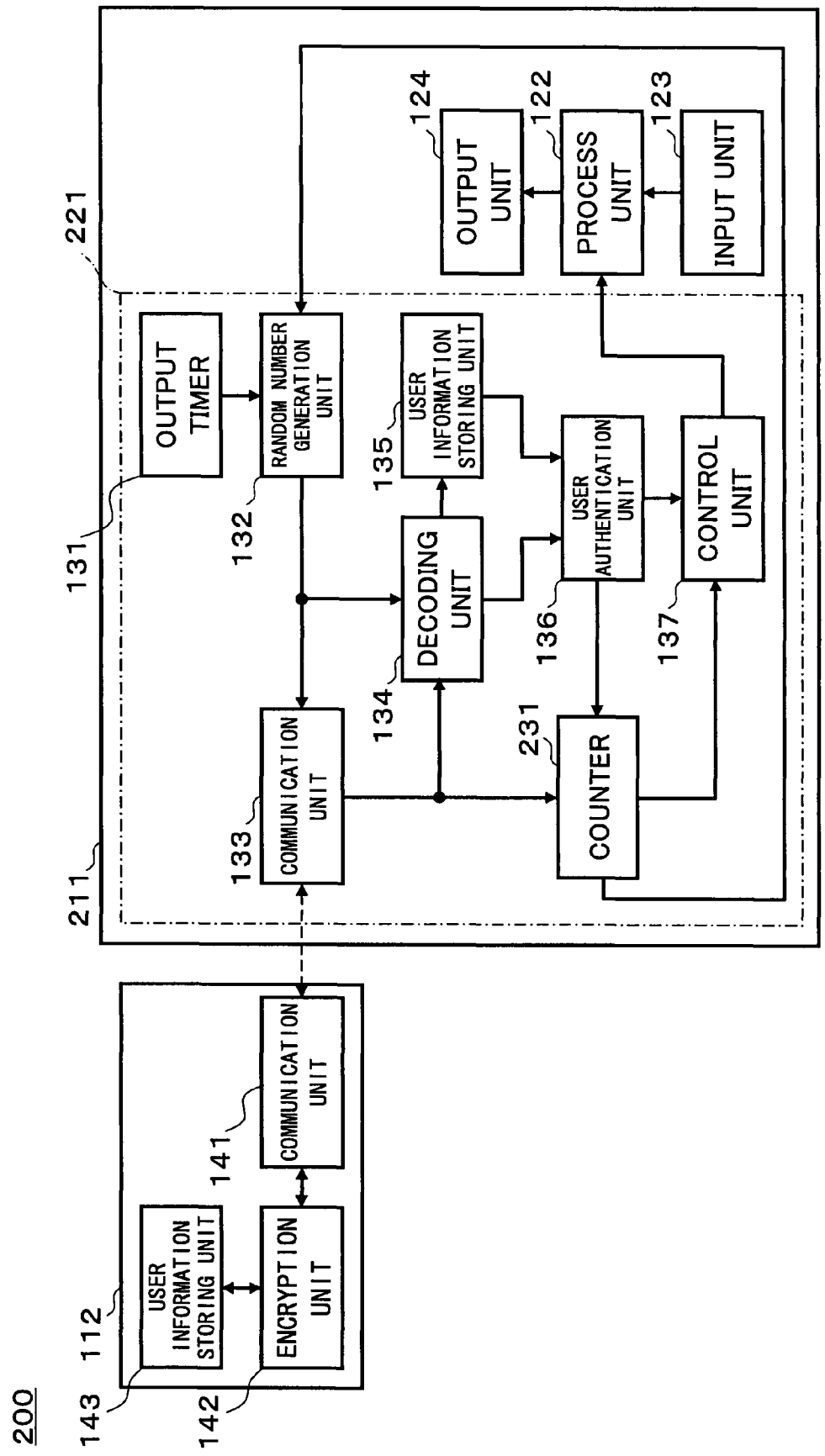
FIG. 6 is a block diagram showing a computer 211 and the mobile terminal apparatus 112 of a second embodiment of the present invention.

FIG. 6 shows a block diagram of a second embodiment of the present invention. In the figure, same signs are assigned to configuration units the same as those shown in FIG. 2.

The information processing system 200 of the present embodiment is different from the configuration shown in FIG. 2 in that the configuration of the computer 211 is different from that shown in FIG. 2. More particularly, the configuration of the access control unit 221 of the computer 211 is different from that shown in FIG. 2. The access control unit 221 of the present embodiment includes a counter 231.

When access control is performed, the counter 211 is set to be a predetermined counter value. Each time when data from the mobile terminal apparatus 112 cannot be received after sending the random number Kt or each time when user authentication cannot be succeeded, the counter value is decremented.

Figure 7:
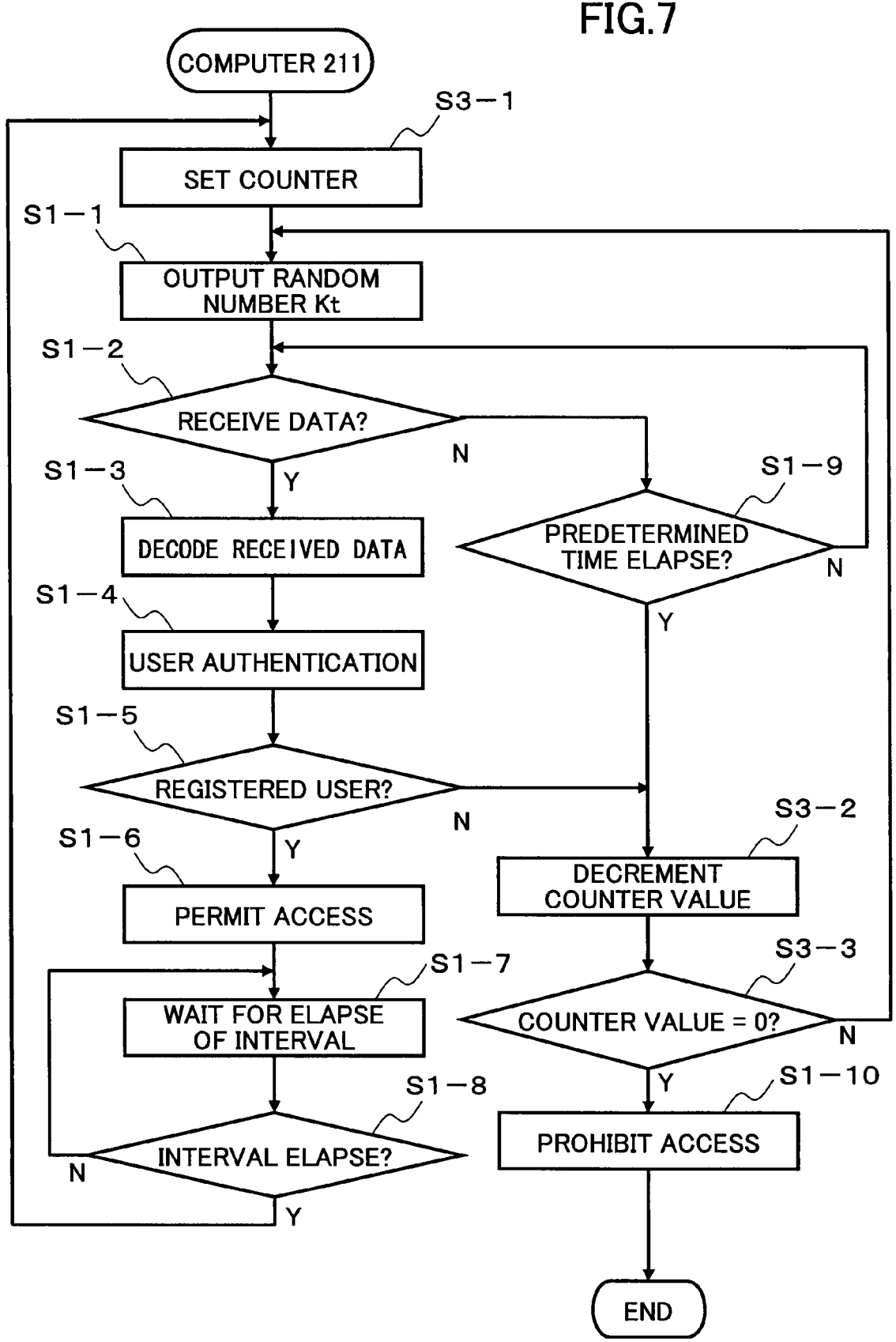
FIG. 7 shows a process flowchart for access control of the computer 211.

FIG. 7 shows a process flowchart for access control of the computer 211. In the figure, same process steps as FIG. 4 are assigned same signs.

When the output timer 131 of the computer 211 detects timing for performing access control, the computer 211 sets a predetermined counter value to the counter 231 in step S3-1. After that, the computer 211 repeats steps S1-1-S1-8.

When the computer 211 does not receive data for a predetermined time in step S1-9, or when the computer 211 detects that received data does not correspond to any user information stored in the user information table 135 in step S1-5, the computer 211 decrements the counter value of the counter 231 in step S3-2.

The computer 211 determines whether the counter value is "0" in step S3-3. When the counter value is "0" in step S3-3, the computer prohibits access to the process unit 122 in step S1-10. When the counter value is not "0", the computer 211 returns to step S1-1 to send a random number and wait for receiving data again.

According to the present embodiment, when it is determined that data is not received a predetermined number of times using the counter 231, or when it is determined that authentication of received data is rejected a predetermined number of times using the counter 231, access to the process unit 122 is prohibited. Accordingly, even when communication environment is bad, authentication can be performed with reliability.

The communication units 133 and 141 are not limited to the wireless or non-contact type interface, but they may by a cable interface such as a USB.

Figure 8:
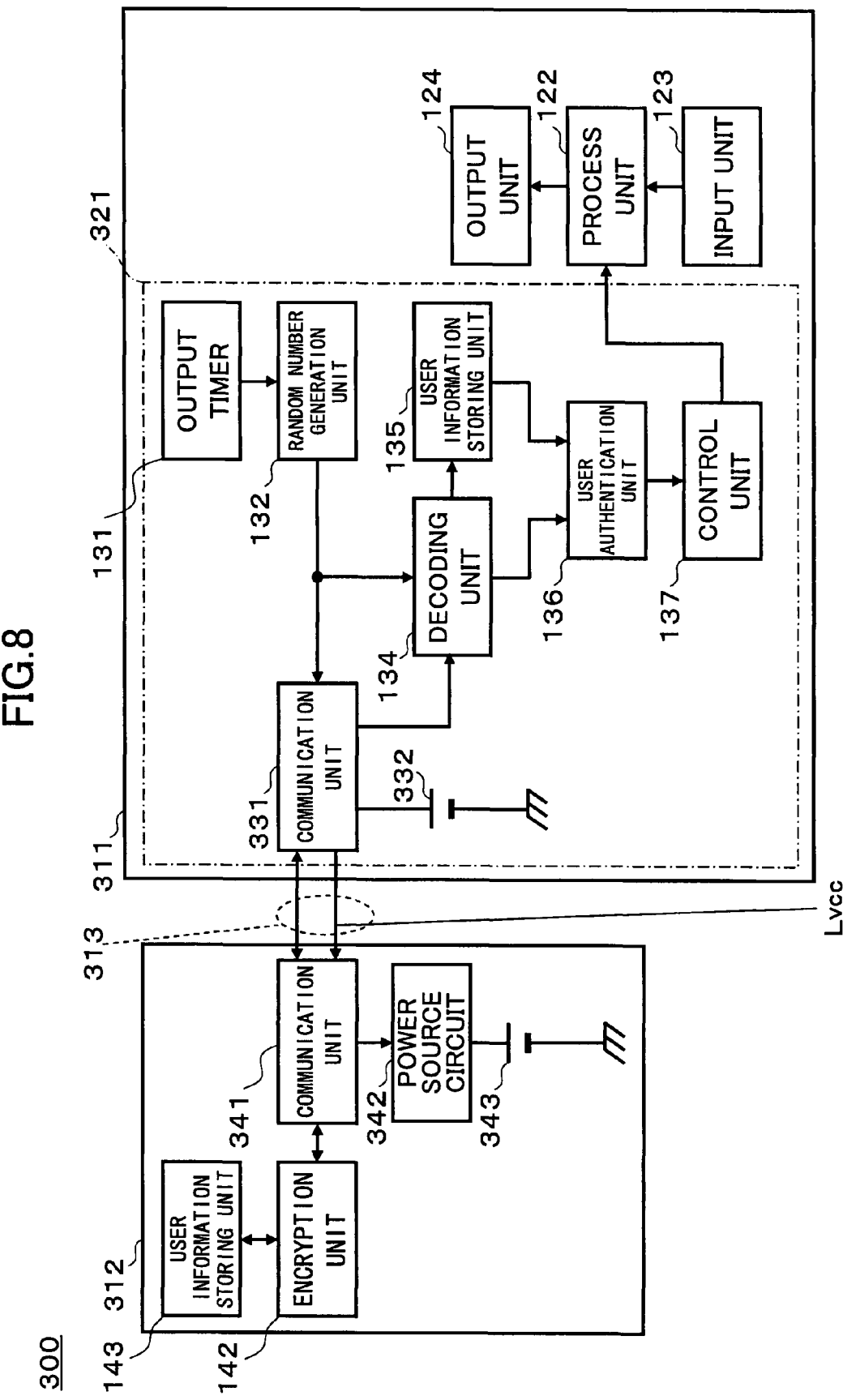
FIG. 8 is a block diagram showing a computer 311 and a mobile terminal apparatus 312 of a third embodiment of the present invention.

FIG. 8 shows a block diagram of a third embodiment of the present invention. In the figure, same signs are assigned to configuration units the same as those shown in FIG. 1.

The information processing system 300 of the present embodiment is different from the information processing system in the first embodiment in that configuration of the communication unit 331 of the access control unit 321 of the computer 311 and configuration of the communication unit 341 of the mobile terminal apparatus 312 are different from those of the first embodiment.

The communication unit 331 of the access control unit 321 of the computer 311 and the communication unit 341 of the mobile terminal apparatus 312 are USB interfaces, for example. They are connected to each other via a USB cable 313. A power source voltage of 5 V from a direct current power source 332 is applied on the communication unit 331 of the computer 311. In addition, a power source circuit 342 is connected to the communication unit 341 of the mobile terminal apparatus 312.

The communication unit 331 supplies the 5V power source voltage supplied from the direct current power source 332 to the communication unit 341 of the mobile terminal apparatus 312 via a power source line Lvcc of the USB cable 313.

The communication unit 341 supplies the 5V voltage supplied via the power source line Lvcc of the USB cable 313 to the power source circuit 342. The power source circuit 342 includes an inverter and a charging control circuit and the like, it converts the 5V power source voltage supplied from the communication unit 341 to a predetermined voltage to charge a secondary battery 343.

According to the present embodiment, since the USB interface is used, the 5V power source voltage is supplied to the mobile terminal apparatus 312 from the computer 311 via the USB cable 313 so that the mobile terminal apparatus 312 can be charged. Accordingly, the access control can be performed while charging the mobile terminal apparatus 312.

In addition, the mobile terminal apparatus 312 may send a remaining amount of electricity of the embedded secondary battery when sending the encrypted user information to the computer 311.

Figure 9:
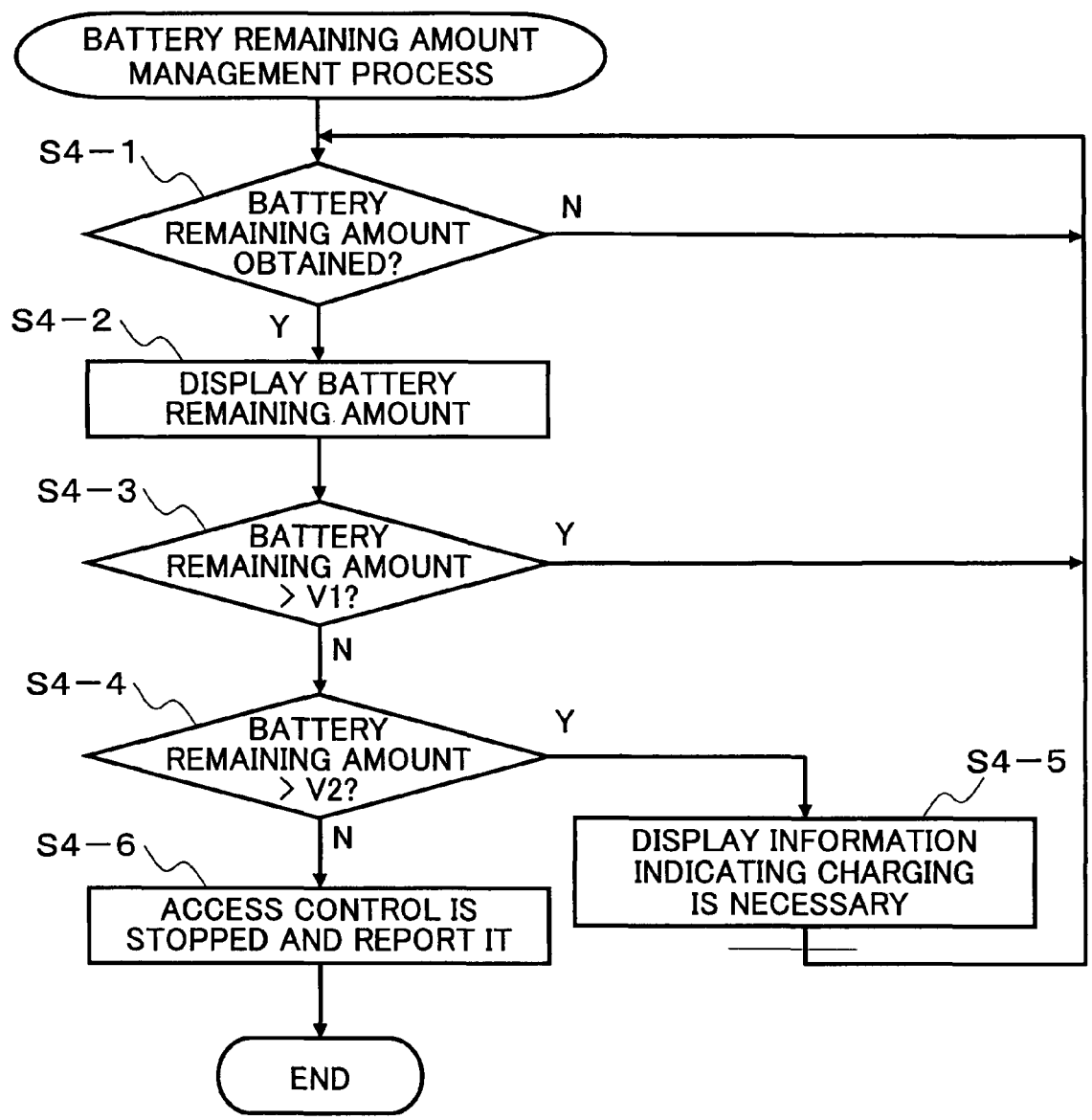
FIG. 9 shows a process flowchart for managing battery remaining amount of the computer 311.

FIG. 9 shows a process flowchart for managing battery remaining amount of the computer 311.

The computer 311 obtains battery remaining amount information from the mobile terminal apparatus 312 in step S4-1, the computer 311 displays the remaining amount of the secondary battery of the mobile terminal apparatus 312 on the output unit 124.

Next, the computer 311 determines whether the remaining amount of the secondary battery of the mobile terminal apparatus 312 is greater than a first electricity amount (V1) in step S4-3. When the battery remaining amount is greater than the first electricity amount V1, the computer 311 returns to step S4-1 and waits until it receives a next battery remaining amount from the mobile terminal apparatus 312.

When the battery remaining amount is less than the first electricity amount V1, the computer 311 determines whether the remaining amount of the secondary battery of the mobile terminal apparatus 112 is greater than a second electricity amount (V2<V1). When the remaining amount of the secondary battery is greater than the second electricity amount V2, the computer 311 displays information indicating that charging is necessary for the mobile terminal apparatus 312 on the output unit 124 in step S4-5.

When the remaining amount of the secondary battery is less than the second electricity amount V2, the computer 311 stops access control by the access control unit 321 in step S4-6 and instructs the output unit 124 to display information indicating that access control is stopped.

Accordingly, it can be avoided that access to the computer 311 is prohibited due to battery exhaustion of the mobile terminal apparatus 312.

The present invention is not limited to the specifically disclosed embodiments, and variations and modifications may be made without departing from the scope of the present invention.

The present application contains subject matter related to Japanese patent application No. 2006-202356, filed in the JPO on Jul. 25, 2006, the entire contents of which are incorporated herein by reference.

What is claimed is:

1. An information processing system, comprising:
   a computer; and
   a mobile terminal that can communicate with the computer in a predetermined area, and
   wherein, the computer sends a random number for encrypting user information to the mobile terminal, the computer registering identification information of mobile terminals to be permitted to access the computer;
   the mobile terminal encrypts user information using the random number sent from the computer, and sends the encrypted user information to the computer, the user information indicating identification information in relation to access to the computer from the mobile terminal;
   the computer decodes the encrypted user information sent from the mobile terminal using the random number, and compares the decoded information with the identification information registered; and
   when the decoded user information is the same as the identification information that is registered in the computer, the computer permits access to the computer, when the decoded information is not the same as the identification information that is registered, the computer prohibits access to the computer.

2. The information processing system as claimed in claim 1, wherein, when the decoded information is not the same as the user information that is registered beforehand for a predetermined time, the computer prohibits access to the computer.

3. The information processing system as claimed in claim 1, wherein the random number is a code.

4. The information processing system as claimed in claim 1, wherein communication between the computer and the mobile terminal is performed by a non-contact interface.

5. The information processing system as claimed in claim 1, wherein communication between the computer and the mobile terminal is performed by a wireless communication scheme.

6. The information processing system as claimed in claim 1, wherein communication between the computer and the mobile terminal is performed by an optical communication scheme.

7. The information processing system as claimed in claim 1, wherein communication between the computer and the mobile terminal is performed by a cable communication scheme.

8. The information processing system as claimed in claim 7, wherein the mobile terminal includes:
   a battery; and
   a power source circuit for charging the battery with power supplied via a communication route of the cable communication scheme.

9. An information processing apparatus including a communication unit for communicating with a mobile terminal in a predetermined area, comprising:
   a code generation unit configured to generate a random number used for encryption of user information and sends the random number to the mobile terminal using the communication unit, the number generation unit being configured to communicate with a computer registering identification information of mobile terminals to be permitted to access the computer and the user information indicating identification information in relation to access to the computer from the mobile terminal;
   a decoding unit configured to decode user information encrypted using the random number sent from the code generation unit in the mobile terminal and received from the mobile terminal by the communication unit using the random number;
   an access control unit configured to compare the decoded user information with the identification information registered in the computer, permit access to the computer when the decoded user information is the same as the registered user information, and prohibit access to the computer when the decoded user information is not the same as the registered identification information.

10. The information processing apparatus as claimed in claim 9, wherein, when the decoded information is not the same as the user information that is registered beforehand for a predetermined time, the access control unit prohibits access to the computer.

11. The information processing apparatus as claimed in claim 9, wherein the random number is a code.

12. A mobile terminal apparatus configured to be able to communicate with a computer in a predetermined area, comprising:
   a communication unit configured to communicate with the computer and receive a random number for encrypting user information from the computer, the communication unit being configured to communicate with the computer registering identification information of mobile terminals to be permitted to access the computer; and
   an encryption unit configured to encrypt the user information using the random number received from the computer via the communication unit, and send the encrypted user information to the computer from the mobile terminal apparatus via the communication unit, and
   where access to the computer is permitted when decoding of the encrypted user information from the mobile terminal apparatus matches the identification information registered in the computer and the user information indicates identification information in relation to access to the computer from the mobile terminal.

13. An access control method, comprising:
   providing an information processing system including a computer and a mobile terminal that can communicate with the computer in a predetermined area, and
   wherein, the computer sends a random number for encrypting user information to the mobile terminal, the computer registering identification information of mobile terminals to be permitted to access the computer;
   the mobile terminal encrypts user information using the random number sent from the computer, and sends the encrypted user information to the computer, the user information indicating identification information in relation to access to the computer from the mobile terminal;
   the computer decodes the encrypted user information sent from the mobile terminal using the random number, and compares the decoded information with the identification information registered;
   when the decoded user information is the same as the identification information that is registered, the computer permits access to the computer, when the decoded information is not the same as the identification information that is registered, the computer prohibits access to the computer.

14. The information processing method as claimed in claim 13, wherein, when the decoded information is not the same as the user information that is registered beforehand for a predetermined time, the computer prohibits access to the computer.

15. The information processing method as claimed in claim 13, wherein the random number is a code.

* * * * *